July 21, 1959  G. T. KOHMAN  2,895,812
GROWING OF QUARTZ CRYSTALS
Filed July 28, 1954

INVENTOR
G. T. KOHMAN
BY
*Edwin B. Cave*
ATTORNEY

United States Patent Office 2,895,812
Patented July 21, 1959

2,895,812

GROWING OF QUARTZ CRYSTALS

Girard T. Kohman, Summit, N.J., assignor to Bell Telephone Laboratories, Incorporated, New York, N.Y., a corporation of New York Application July 28, 1954, Serial No. 446,315

9 Claims. (Cl. 23—301)

This invention relates to methods of growing quartz crystals synthetically. More particularly, it relates to such methods as carried out in an improved design of autoclave.

Quartz crystals have been successfully grown at reasonable rates by maintaining quartz seeds and a quartz nutrient in contact with an alkaline aqueous medium at extremely high temperatures and pressures and by maintaining the quartz seeds at a slightly lower temperature than the nutrient. This process has been carried out in cylindrical autoclaves positioned with the axis of the cylinder vertically disposed. The nutrient has been placed in the lower portion of the cylinder and the quartz seeds have been suspended above the nutrient. The temperature differential has been maintained by heating the autoclave at the bottom and allowing the heat to be radiated at a controlled rate from the upper portion of the autoclave.

The present invention resides in carrying out this process in such an autoclave in which a baffle or restricting means is situated between the nutrient region and the seed region. The advantages following from the use of this restricting means will be apparent from the description below.

Figure 1:
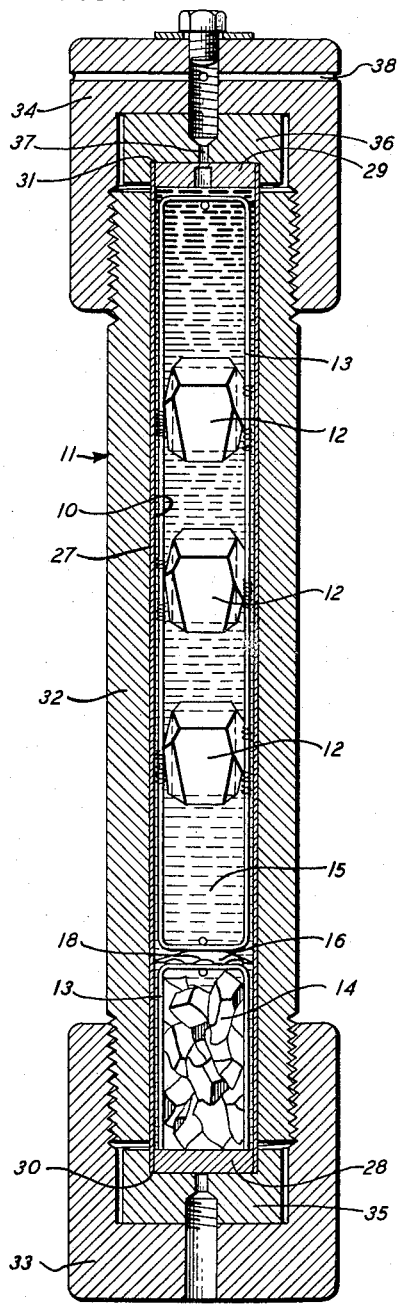
Fig. 1 is a front elevation, in section, of a charged autoclave assembly, including a baffle, for use in carrying out the process of the present invention.

In the apparatus of Fig. 1, the growing of the crystals is carried out within an expendable liner 10, which is not of itself capable of withstanding the pressures generated in the process but which serves to seal in the aqueous medium so as to prevent leakage. The expendable liner 10 is fitted snugly within a pressure-resistant outer container or bomb 11 which is capable of restraining the liner 10 against destruction by the internal pressure and which is in turn protected against corrosion by the expendable liner 10.

Within the liner 10, one or more quartz seeds 12 are suspended by means of wire support 13. A mass 14 of pieces of quartz, which serves as a nutrient for the growth of the crystals, is situated in the lower portion of the reaction chamber defined by the liner 10. At operating temperatures, this chamber is filled completely by an aqueous alkaline solution 15 which serves as the transport medium for carrying silica from the nutrient mass to the seeds.

Figure 2:
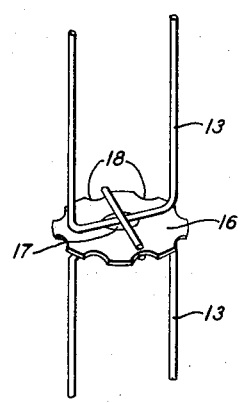
Fig. 2 is a perspective view of the baffle and a portion of the wire support shown as a part of the apparatus of Fig. 1.

The baffle 16, which represents the primary feature of the present invention, is situated above the top level of the nutrient mass 14 but below the lowermost quartz seed and is held in place by the wire support 13. This baffle, as shown in Figs. 1 and 2, may be in the form of a slightly conical sheet having its apex facing upward. The periphery of the baffle is essentially circular and of such size that it fits the inner circumference of the liner 10 with little clearance. The baffle, as shown, has a central opening 17 and a plurality of peripheral openings 18 distributed about its circumference. The sum of the areas of the peripheral openings is substantially equal to the area of the central opening.

The form of the baffle is not critical so long as it serves to restrict convective flow of the aqueous medium between the nutrient region and the seed region. By so doing, the baffle serves to maintain the functions of the two regions distinct so that dissolution of silica occurs in the nutrient region and desposition of silica occurs on the seeds. More effective growth of the crystals is the result.

Figure 3:
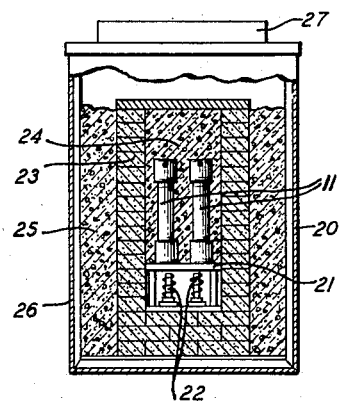
Fig. 3 is a front elevation, partly in section, of a furnace in which a plurality of the bomb assemblies of Fig. 1 are heated.

In order to carry out the growing of the crystals, one or more of the charged bombs 11, shown in Fig. 1, are placed in a suitable furnace 20 as shown in Fig. 3. In the furnace of Fig. 3, the bombs 11 are set vertically on a hot plate 21 which is heated from below in any suitable manner, as by means of electric resistance heaters 22. The hot plate, heaters and bombs are surrounded by a fire brick enclosure 23, open at the top, defining a chamber 24.

In order to maintain the required temperature gradient between the bottoms and tops of the bombs, the space 24 is filled to the required level with any suitable heat-resistant, heat-insulating substance such as vermiculite. When the space 24 is completely filled with heat-insulating material, the minimum temperature differential between the tops and the bottoms of the bombs is maintained. This temperature differential is increased as the level of insulating material is lowered, exposing more and more of the upper part of the bombs.

A supplementary heat insulation 25 of any suitable material, such as vermiculite, surrounds the fire brick enclosure 23 and is contained in an outer shell 26, which may be formed of sheet metal, having a sheet metal cover 27 which is vented to permit escape of gasses if the safety device of a bomb is released. The furnace is preferably provided with automatic controls which maintain the hot plate 21 at a fixed temperature.

The hot plate of the furnace is maintained at the required temperature for a period of time sufficient to permit the desired amount of growth of the crystal seeds at the expense of the quartz nutrient. The furnace is then allowed to cool, the bombs are removed and opened, and the crystals are removed from the bombs.

Referring again to Fig. 1, the liner 10 is made up of a cylindrical steel tube 27 into the ends of which are fitted circular end plates 28 and 29. These end plates are welded to the cylindrical tube 27 at the respective edges 30, 31 of the tube. The welded edges are machined flush with the outer diameter of the tube.

The liner 10 is charged with the quartz seeds, nutrient material and aqueous medium after the lower end plate 28 has been welded in place but before the upper end plate 29 has been placed in position. The upper end plate is then welded into place and the completed liner is inserted in the bomb 11.

The bomb 11 is formed of a heavy cylindrical tube 32 having caps 33, 34 screwed on its two ends. The inner bore of the cylindrical tube 32 is of such size that it snugly fits cylindrical tube 27 of the liner while permitting easy insertion of the liner.

The tendency of the pressure, generated within the sealed liner during operation, to spread the tube 27 from the end plates 28, 29 is repressed by means of retaining caps 35, 36. When held in place by the screw caps 33, 34 of the bomb, the retaining caps 35, 36 effectively prevent leakage at the welds of the liner.

The upper retaining cap 36 is provided with a central bore 37 of such size that at a predetermined safe pressure, higher than the normal operating pressure, the portion of the upper end plate 29 opposite the opening in the retaining cap will rupture and release the pressure. In this manner, an effective safety release is provided in the event that the pressure within the bomb accidentally becomes excessive. The upper screw cap is provided with passages 38 which serve to conduct the released vapor to the outside of the bomb.

Any suitable dimensions and materials may be used in the construction of the bomb and the liner shown in Fig. 1 as required by the pressures developed in the process. It has been found convenient to form the internal chamber of the liner 10 with a height from about eight to twelve or sixteen times its diameter, but these proportions may be varied within any practical limits. The liner may conveniently be made of seamless tubing formed of a low carbon steel, such as commercial steels containing not more than .3 percent carbon and preferably not more than .2 percent carbon, but any metal of adequate strength and resistance to corrosion by the contents of the liner at the temperatures and pressures employed may be used. When maximum pressures up to about 20,000 pounds per square inch are employed, it has been found convenient to form the tube 32 of the bomb from suitably tempered tool steel or stainless steel with an outer diameter which is twice the internal bore. Such bombs can conveniently be constructed with internal diameters between 1 inch and 6 inches.

In order for a practical rate of growth to be obtained during the operation of the crystal growing process, it is necessary for certain conditions to be maintained. Since spurious seeding must be eliminated or minimized in order to maintain a sustained high growth rate, it is necessary that forms of silica be excluded from the system which are substantially more soluble than quartz and which would therefore lead to a degree of supersaturation which cannot be controlled. The nutrient which is used should therefore be substantially free of forms of silica other than quartz.

The quartz used as the nutrient should possess a particle size such as to present a sufficient surface area to the solvent to permit the quartz to be dissolved sufficiently rapidly to sustain the desired rapid growth of the seed crystal. It has been found that with proper control of the other conditions, sustained rapid growth may be obtained with a nutrient consisting of quartz particles of such size that the average particle diameter is as large as about ⅛ to ¼ the diameter of the growing chamber within the liner 10. When quartz with a decreasing particle size is used, the rate of dissolution increases. Particle sizes down to .01 inch or smaller may be satisfactorily used in a baffle equipped bomb.

A convenient size of quartz for use as the nutrient is in the form of particles which will pass a No. 4 sieve (.187-inch openings) but not a No. 6 sieve (.132-inch openings).

The seeds 12 may consist of any whole crystals, fragments or cuts of natural or synthetic quartz. The seeds should be free of twinning if it is desired to produce an untwined crystal. Since the growth of the crystal is essentially entirely in the direction of the primary crystallographic axis, with substantially no growth in perpendicular directions, it is convenient to use a plate cut so that its faces are perpendicular to the crystallographic axis. It is also convenient to mount the seed with the crystallographic axis vertical so that the growth will take place along the length of the cylindrical chamber within the liner 10. Another cut that is more advantageous, in that it gives the most rapid rate of growth, is a plate having its faces cut parallel to a minor rhombohedral face of the crystal. Best growth is obtained if this plate is mounted with its faces parallel to the axis of the bomb.

Growth of the seed crystal has been obtained by the process of the present invention only when the aqueous medium used for transporting the silica from the nutrient to the seed has contained sodium ions. No substantial growth has been obtained with ions of the other alkali metals. The most suitable compounds for supplying the sodium ions have been found to be sodium hydroxide, sodium carbonate and sodium silicate. Since sodium silicate is the reaction product of silica and sodium hydroxide, it is apparent that whether sodium hydroxide or sodium silicate is added initially, the solute will be sodium silicate during the operation of the process.

Sodium carbonate permits the rapid growth of quartz with a small temperature differential between nutrient and seed. However, in a reaction chamber in which a higher temperature differential can be readily maintained, it may be more advantageous to use sodium hydroxide (or sodium silicate) since the system is more stable with this compound so that there is a lesser tendency toward spurious seeding and since clearer, more perfect crystals are formed.

Growth can be obtained with other inorganic sodium salts, particularly salts of weak acids. Salts of sodium with organic acids which are stable against substantial decomposition at the temperatures and concentrations used may also be employed. Mixtures of sodium hydroxide and sodium carbonate or of sodium silicate and sodium carbonate or of all three compounds may be used.

For reasonably rapid growth, the concentration of sodium ions in the aqueous solution should be at least about 0.2 normal and preferably about 0.5 normal. Concentrations as high as about 4 normal or 5 normal or higher, may be used if desired.

The growing of the quartz crystals by the process of the present invention is carried out with the aqueous solution at temperatures and pressures preferably above the critical temperature and critical pressure of the aqueous solution. With the higher bomb fills, the minimum temperature can be somewhat lower than with smaller bomb fills. The temperature in the coolest part of the chamber should not fall below 350° C. and should preferably be at least 375° C. When the sodium ions in the aqueous medium are derived primarily from sodium carbonate, this temperature should be at least 375° C. and preferably at least 380° C.

The rate of growth of the crystal appears to increase somewhat as the average temperature in the chamber is increased but the temperature of the growing crystal should be maintained safely below 573° C., the inversion temperature for quartz and safely within the mechanical limitations of the bomb in which the growing takes place. It is preferable that the temperature in the vicinity of the crystals not exceed about 550° C. More practical operating temperatures are below 500° C., and preferably below 450° C., in the region occupied by the nutrient. With an aqueous medium containing sodium carbonate, very satisfactory results have been obtained with the operating conditions such that the externally measured temperature at the portion of the bomb corresponding to the upper surface of the mass of quartz nutrient is between about 395° C. and about 415° C. and preferably at about 400° C. With an aqueous medium in which the sodium ions are derived primarily from sodium hydroxide, this temperature is preferably between 400° C. and 425° C. The externally measured temperature at this point appears to approximate the internal temperature. In general, a practical rate of growth cannot be achieved if the external temperature at this point falls below about 380° C.

The density of the aqueous medium in which the quartz crystal is grown, and therefore the pressure existing in the bomb during the growing operation, exert a considerable influence upon the rate at which the quartz crystal is grown. The density, or inversely the specific volume, of the aqueous medium is controlled by the degree to which the free space in the growing chamber is filled with the aqueous solution prior to the sealing of the chamber. Filling about 33 percent of the free space in the chamber with liquid at room temperature will result in a specific volume, at the critical temperature, which is equal to the critical volume. Practical rates of growth can be achieved by the present process only by using considerably higher degrees of fill, with correspondingly lower specific volumes.

To obtain a practical rate of growth, it is necessary to fill the free space of the chamber, excluding the space occupied by nutrient, seeds and supporting means, to at least 60 percent with the liquid aqueous growing medium at room temperature. As the degree of fill is increased, the growing rate increases markedly. The upper limit to the degree of fill to be used is set only by the ability of the bomb to withstand the pressure which is generated. A fill of about 80 percent has been found very satisfactory but a fill of 90 percent will give better results in a bomb designed to withstand the pressure.

With a liquid fill of 60 percent of the free space at room temperature, the specific volume of the aqueous solution above the critical point is about 1.67 times the specific volume of the liquid at room temperature. With fills of 80 percent and 90 percent, the specific volumes above the critical point are 1.25 and 1.11 times those at room temperatures, respectively.

It is important to the rate of growth of the crystal that the proper temperature differential be maintained throughout the process, between the aqueous solvent leaving the mass of quartz nutrient and the aqueous solvent in the vicinity of the quartz seed crystal. With a very small temperature differential, the rate of growth is slow. As the differential increases, the rate of growth increases but, if it becomes excessive, a degree of spurious seeding occurs on the walls of the bomb. In avoiding the possibility of spurious seeding, it is necessary to avoid an excessive temperature differential not only between the nutrient mass and the seed crystals, but also between the nutrient mass and any portion of the bomb. As indicated above, the temperature differential can be controlled with the apparatus shown in the drawing by varying the amount of insulation placed around the bombs in the furnace. The tendency toward spurious seeding is much less when an aqueous medium is used in which the sodium ions are derived from sodium hydroxide than when the sodium ions are derived from sodium carbonate.

In the apparatus shown in the drawing, it is convenient to measure the temperature differential of the external surface of the bomb at a point just below the level of the baffle and at a point just below the lower edge of the upper screw cap 34. In steel bombs, which are upright circular cylinders and in which the inside diameter is approximately one-half of the outside diameter, the externally measured temperature differential gives a reasonably consistent indication of conditions within the bomb, regardless of bomb size.

As indicated above, when sodium hydroxide (or sodium silicate) is used as a source of sodium ions, a higher temperature differential can be tolerated without spurious seeding than when sodium carbonate is used. A higher temperature differential is also required with sodium hydroxide than with sodium carbonate in order to achieve the same rate of quartz growth.

When sodium carbonate is used as the source of more than 50 percent of the sodium ions, the externally measured temperature differential should be held to between 5° C. and 25° C. In most instances this differential will be held to between 10° C. and 20° C.

When sodium hydroxide is used as the sole or primary source of sodium ions, a higher temperature differential should be used to obtain rapid growth. A temperature differential of about 50° C. has been found suitable. Differentials as low as about 25° C. or 30° C. and as high as 70° C. can be used satisfactorily.

When mixtures of sodium hydroxide and sodium carbonate are used, it is apparent that the optimum temperature differential for rapid growth without spurious seeding can be made to fall between the optimum of about 50° C. for sodium hydroxide alone and the optimum of between 10° C. and 20° C. for sodium carbonate alone.

The presence of the baffle in the growing chamber maintains conditions such that there is very little temperature differential in the aqueous medium between different levels in the region above the baffle which contains the growing crystals and there is very little temperature differential between different levels in the region below the baffle which contains the nutrient. There is, however, a sharp differential between the temperatures in the two regions.

It can be argued that this temperature relationship results, at least in part, from the action of the baffle in simply restricting circulation of the aqueous medium between the two regions. However, a baffle with even a small opening does not interfere with silica transport from nutrient to seed. In fact, the baffle appears to facilitate this transport substantially. This increased transport is consistent with a more dynamic action of the baffle rather than with a mere restriction of circulation.

In the prior art growing of crystals of various types other than quartz, effective circulation of the transport medium has been considered essential. Pumps have ordinarily been employed to produce this circulation in systems operated at substantially atmospheric pressure. In the growing of quartz, where extremely high pressures are employed, much effort has been expended in attempts to develop pumps which would provide similar circulation. As an alternative procedure, a two chamber autoclave has been developed which is rocked mechanically, giving a pumping action, but such apparatus involves a complicated mechanism.

It has occurred to applicant, in view of the properties of the transport medium, that what might be termed a diffusion pump operating in a simple single chamber autoclave could facilitate the desired circulation. These properties of the medium are the relatively large changes in local density which occur with relatively small temperature changes as a result of the fact that the aqueous medium is a high density gas which is utilized at temperatures not far from the critical temperature. The sharp changes in local density and pressure with temperature create large convective forces and create conditions which may be utilized to generate a circulatory action of considerable energy.

Tests have shown that a baffle of the type described can provide the desired pumping or circulatory action, thereby providing the advantages of mechanical circulation without the inherent disadvantages of such mechanical apparatus. It is conceivable that the expansion of the gas through the openings of the baffle as a result of such a pumping action produces a substantial portion of the desired sharp drop in temperature between the nutrient region and the quartz growing region.

The above-mentioned maintenance of more uniform temperatures within the nutrient region and within the crystal growing region results in benefits in both regions. Since transport of a silica-saturated solution from a warmer to a cooler region tends to cause quartz deposition, it is apparent that, if the upper nutrient levels are cooler than the lower nutrient levels, quartz dissolved at the lower levels will be deposited on the nutrient particles at the upper levels. Such deposition has two undesirable results. First, continued deposition at the upper nutrient levels tends to close the openings between particles so that circulation between large parts of the nutrient mass and the seed-containing region may be cut off. When this occurs, the rate of crystal growth is substantially reduced. Secondly, the deposition of quartz on the upper nutrient levels reduces the amount of dissolved silica available in solution for transport to the growing crystals and thus reduces the growing rate even when circulation has not been cut off.

In the crystal growing region, a temperature differential between different levels tends to cause the more rapid growth of those crystals at the cooler level. With non-uniform crystal growth, the lower crystals will not have achieved full size when it becomes necessary to terminate the growing process because the growth of the higher crystals is complete.

The presence of the baffle minimizes these conditions and results in more effective crystal growth. Deposition of silica on the upper nutrient region can be substantially eliminated and the seed crystals can be made to grow at a substantially equal rate regardless of their position in the crystal growing region.

The degree of temperature differential between the nutrient region and the crystal growing region can be controlled by controlling the area of the openings in the baffle. Thus, the total area of the openings may vary between 5 percent and 50 percent of the horizontal cross-sectional area of the chamber, or conversely, the baffle may close off between 50 percent and 95 percent of the horizontal cross-sectional area of the chamber. A convenient ratio of baffle opening area to the horizontal cross-sectional area of the chamber is about 20 percent. No problem of obtaining sufficient silica transport is encountered even with the smaller total area of openings.

The crystal growing process can be carried out in direct contact with the interior surface of the steel liner 10. It is preferable, however, to plate the inside of the liner with a metal which is inert to the process, such as silver.

The following specific example will illustrate the manner in which the present invention may be practiced. A charged bomb having the structure shown in Fig. 1 was prepared. The bomb had an inside diameter of 3¾ inches, an outside diameter of 8 inches and an inside length of 48 inches. A baffle was used in which the area of the openings constituted 20 percent of the total baffle area. A quartz nutrient having a particle size between ¼-inch mesh and ½-inch mesh was employed. The aqueous medium was a 1 normal solution of sodium hydroxide. The interior of the steel liner was silver-plated. Five seed crystals were suspended, one above the other, in the upper part of the bomb with the top seed near the top of the bomb and the bottom seed just above the baffle. The seeds were CT cut quartz crystals which were suspended with their growing faces in a vertical position. A 50° C. temperature differential, as measured on the outside of the bomb, was maintained between the level just below the bottom edge of the upper screw cap and the level just below the position of the baffle, the lower level being maintained at 410° C. and the upper level being maintained at 360° C. The volume of aqueous medium which was charged into the bomb at room temperature constituted 80 percent of the free space in the bomb. An average growth rate of 0.04 inch per day was obtained in this manner for a period of sixty days. No spurious seeds were present and the crystals produced were clear, and weighed nearly one pound. Because of the action of the baffle all seeds grew at substantially the same rate regardless of their position in the autoclave.

The description of the invention above has been in terms of its specific embodiments and, since modifications and equivalents will be apparent to those skilled in the art, is intended to be illustrative of, rather than to constitute a limitation upon, the invention.

What is claimed is:

1. The method of growing quartz crystals in a sealed cylindrical autoclave mounted with its axis substantially vertical and containing a baffle at a point between its ends which closes off a portion only of the horizontal cross-sectional area of said autoclave, said portion being at least 50 percent of the cross sectional area, which method comprises charging said autoclave with a crystalline quartz nutrient below said baffle, at least one quartz seed above said baffle and an amount of an aqueous medium containing sodium ions sufficient to fill at least 60 percent of the remaining space in said autoclave, sealing said autoclave, heating it to quartz-growing temperatures and maintaining the region occupied by the nutrient at a higher temperature than the region occupied by said at least one seed.

2. The method defined in claim 1 in which the aqueous medium is an aqueous solution of sodium hydroxide and in which the autoclave is heated to at least about 350° C.

3. The method defined in claim 2 in which the baffle closes off between 50 percent and 95 percent of the cross-sectional area of the autoclave.

4. In a method in which quartz crystals are grown in a sealed chamber containing a crystalline quartz nutrient, at least one quartz seed and a sufficient amount of an aqueous silica-transport medium to fill at least 60 percent of the remaining free space in the chamber at room temperature by maintaining the nutrient at a higher temperature than said at least one seed and maintaining the contents of the chamber at quartz-growing temperatures, the steps comprising charging said chamber with said nutrient, said at least one seed, said aqueous medium and a baffle closing off at least 50 percent, but not all, of the cross-sectional area of said chamber in such manner that the nutrient is situated below the seed and the baffle is situated between the nutrient and the seed, and subjecting the contents of said chamber to said temperature conditions.

5. The method described in claim 1 wherein the baffle is so constructed that a portion of the cross-sectional area which is not closed off occurs adjacent to the cylindrical internal surface of the autoclave, and another portion of the cross-sectional area which is not closed off occurs in a more central location on said baffle, whereby fluid flow may occur in one direction adjacent to the wall of the autoclave and in the other direction at a distance from the autoclave wall.

6. The method defined in claim 1 wherein the baffle comprises a generally circular plate having a substantially central opening and a plurality of openings around its periphery, said baffle filling the cross-sectional area of the autoclave except for said openings whereby fluid flow may occur in one direction adjacent to the wall of the autoclave and in the other direction at a distance from the autoclave wall.

7. The method defined in claim 4 wherein the baffle is so constructed that a fraction of the portion of the cross-sectional area of the chamber which is not closed off is disposed adjacent to the edge of the baffle and the remainder of the area which is not closed off is more centrally located whereby fluid flow may occur in one direction adjacent to the edge of the baffle and in the other direction in the more central location.

8. The method defined in claim 1 wherein the baffle comprises a generally circular plate defining an open area at its periphery.

9. The method defined in claim 1 wherein the baffle comprises a generally circular plate, the periphery of which fits against the cylindrical inner surface of the autoclave, said baffle having indentations at its periphery.

References Cited in the file of this patent

UNITED STATES PATENTS

| | | |
|---|---|---|
| 2,675,303 | Sobek et al. | Apr. 13, 1954 |
| 2,785,058 | Buehler | Mar. 12, 1957 |

FOREIGN PATENTS

| | | |
|---|---|---|
| 283,045 | Switzerland | Sept. 1, 1952 |
| 682,203 | Great Britain | Nov. 5, 1952 |
| 930,077 | France | July 28, 1947 |

OTHER REFERENCES

Brown et al.: Mineralogical Magazine (London), vol. 29, No. 217, January 1952, pages 858–879.